United States Patent
Sussman

[11] 3,994,570
[45] Nov. 30, 1976

[54] 10X TWO ELEMENT EYEPIECE

[75] Inventor: Milton H. Sussman, Amherst, N.Y.

[73] Assignee: American Optical Corporation, Southbridge, Mass.

[22] Filed: Aug. 25, 1975

[21] Appl. No.: 607,175

[52] U.S. Cl. ............................. 350/175 E; 350/231
[51] Int. Cl.² ........................................ G02B 25/00
[58] Field of Search ........................ 350/175 E, 231

[56] References Cited
UNITED STATES PATENTS

| | | |
|---|---|---|
| 873,870 | 12/1907 | Konig ............................. 350/175 E |
| 1,479,229 | 1/1924 | Erfle .................................. 350/231 |

*Primary Examiner*—John K. Corbin
*Assistant Examiner*—Conrad Clark
*Attorney, Agent, or Firm*—Alan H. Spencer; William C. Nealon; H. R. Berkenstock, Jr.

[57] ABSTRACT

A two element 10X eyepiece has a field of view of about 44° and provides a wide field (20mm) with lenses having curve-diameter ratios considered desirable from a manufacturing view.

2 Claims, 1 Drawing Figure

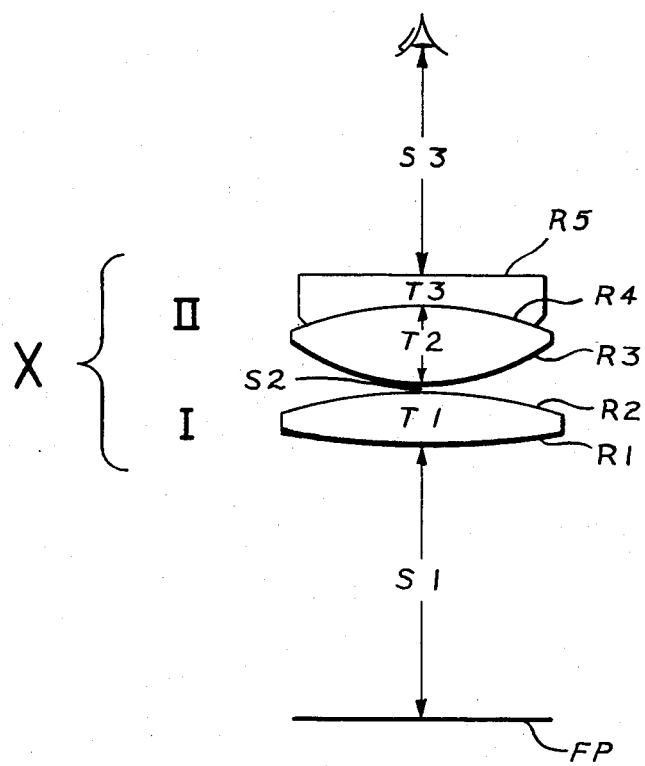

10X TWO ELEMENT EYEPIECE

BACKGROUND OF THE INVENTION

This invention relates to microscope eyepieces and more particularly to an eyepiece having a magnification of substantially 10X, an apparent field of view of about 44° and of simplified design. It an object of this invention to provide an eyepiece well-correct for coma, astigmatism, distortion and lateral color. It is a further object of this invention to provide a microscope objective having two elements and curve-diameter ratios considered desirable in manufacturing such eyepieces.

THE DRAWING

FIG. 1 is an optical diagram of the eyepiece viewed transverse to the optical axis.

DESCRIPTION OF THE INVENTION

Referring to FIG. 1, an eyepiece X is shown diagramatically with optically aligned lenses I and II. The first element I is a double convex positive singlet, and the second element II is a convex-plano positive doublet. The eyepiece has a Petzval radius of about 1.42F and eye-relief of about 0.78F which is adequate for comfortable viewing with or without eyeglasses.

The parameters of an eyepiece according to the present invention are set forth in Table I with the axial thicknesses of successive lens elements designated T1 to T3, and the successive axial spaces from the eyepiece focal plane FP to the observer's eye designated S1 to S3. The successive lens radii are designated R1 to R5 where the minus sign (−) applies to surfaces whose center of curvature lies on the focal plane side of their vertices. The refractive indices and Abbe numbers of the glasses in the successive lenses are fixed absolute values designated ND(1) to ND(3), and $\nu(1)$ to $\nu(3)$ respectively.

TABLE I

| Lens | Radius (R) | Thickness (T) | Spacing (S) | Index of Refraction (ND) | Abbe No. ($\nu$) |
|---|---|---|---|---|---|
|  |  |  | $S_1$=0.9372F |  |  |
| I | $R_1$=3.2047F | $T_1$=0.1823F |  | $ND_1$=1.517 | $\nu_1$=64.5 |
|  | $R_2$=−1.4414F |  | $S_2$=0.0040F |  |  |
|  | $R_3$=0.7649F |  |  |  |  |
| II | $R_4$=−1.1823F | $T_2$=0.2735F |  | $ND_2$=1.517 | $\nu_2$=64.5 |
|  | $R_5$=∞ | $T_3$=0.1000F |  | $ND_3$=1.786 | $\nu_3$=25.5 |
|  |  |  | $S_3$=0.7821F |  |  |

Wherein F is the focal length of the eyepiece in millimeters.

An embodiment of the present invention with a focal length F of 25.01 has the following values:

TABLE II

| Lens | Radius (R) | Thickness (T) | Spacing (S) |
|---|---|---|---|
|  |  |  | $S_1$=23.44 |
| I | $R_1$=80.15 | $T_1$=4.56 |  |
|  | $R_2$=−36.05 |  |  |
|  | $R_3$=19.13 |  | $S_2$=0.10 |
| II | $R_4$=−29.57 | $T_2$=6.84 |  |
|  | $R_5$=∞ | $T_3$=2.50 |  |
|  |  |  | $S_3$=19.56 |

It will be apparent that the foregoing absolute values are variable depending on the value of F. Other forms are thus possible and changes may be made in the values of the constructional data named on the relationships in the first of the above charts, without departing from the spirit of this invention.

What is claimed is:

1. A microscope eyepiece having a magnification of about 10X, an apparent field of view of about 44° being wellcorrect for coma, astigmatism, distortion and color, having a focal length F and two lens elements aligned along an optical axis extending from the focal plane of said eyepiece, which comprises a double convex positive singlet I as the first element and a convex-plano positive doublet as the second element to provide a Petzval radius of 1.42F and eye-relief of 0.78F wherein said lens elements have the following values:

| Lens | Radius (R) | Thickness (T) | Spacing (S) | Index of Refraction (ND) | Abbe No. ($\nu$) |
|---|---|---|---|---|---|
|  |  |  | $S_1$=0.9372F |  |  |
| I | $R_1$=3.2047F | $T_1$=0.1823F |  | $ND_1$=1.517 | $\nu_1$=64.5 |
|  | $R_2$=1.4414F |  | $S_2$=0.0040F |  |  |
|  | $R_3$=0.7649F |  |  | $ND_2$=1.517 | $\nu_2$=64.5 |
|  |  | $T_2$=0.2735F |  |  |  |
| II | $R_4$=−1.1823F | $T_3$=0.1000F |  | $ND_3$=1.786 | $\nu$=25.5 |
|  | $R_5$=∞ |  |  |  |  |
|  |  |  | $S_3$=0.7821F |  |  | wherein the axial thicknesses of successive lens elements are $T_1$ to $T_3$, successive axial spaces from the eyepiece focal plane are $S_1$ to $S_3$, successive lens radii are $R_1$ to $R_5$, where the minus sign (−) applies to surfaces whose center of curvature lies on the focal plane side of their vertices, refractive indices and Abbe numbers of the lenses are absolute fixed values $ND_1$ to $ND_3$, and $\nu1$ to $\nu3$ respectively, and F is the focal length in millimeters.

2. The eyepiece according to claim 1 wherein F is 25.01mm.

* * * * *